United States Patent
Ziaylek, Jr. et al.

(10) Patent No.: US 6,702,242 B1
(45) Date of Patent: Mar. 9, 2004

(54) RELEASABLE TANK HOLDING ASSEMBLY SECURABLE TO A HOLLOW SEAT BACK TO FACILITATE DETACHABLE SECUREMENT OF A TANK THEREINTO

(76) Inventors: Theodore Ziaylek, Jr., 140 Riverview Dr., Yardley, PA (US) 19067; Michael Paul Ziaylek, 15 Cold Spring Ave., Yardley, PA (US) 19067; Theodore P. Ziaylek, 152 Riverview Ave., Yardley, PA (US) 19067

(*) Notice: Subject to any disclaimer, the term of this patent is extended or adjusted under 35 U.S.C. 154(b) by 0 days.

(21) Appl. No.: 10/179,672

(22) Filed: Jun. 25, 2002

(51) Int. Cl.[7] .............................. A47K 1/08; A47C 7/62
(52) U.S. Cl. ................. 248/311.2; 248/313; 248/316.1; 248/154; 297/188.04; 297/191
(58) Field of Search .............................. 248/313, 309.1, 248/311.2, 311.3, 316.1, 316.7, 146, 147, 154, 230.1; 297/191, 188.04, 188.05, 217.1, 391, 404; 340/628

(56) References Cited

U.S. PATENT DOCUMENTS

| | | | |
|---|---|---|---|
| 1,788,464 A | * | 1/1931 | Kederis et al. ........ 248/224.51 |
| 2,029,051 A | | 1/1936 | Blevins |
| 2,029,707 A | * | 2/1936 | Dodelin ....................... 248/313 |
| 2,614,519 A | | 10/1952 | Paladino |
| 2,936,992 A | * | 5/1960 | Browning .................... 248/499 |
| 3,144,232 A | | 8/1964 | Smootz |
| 3,204,775 A | | 9/1965 | Smith et al. |
| 3,224,644 A | | 12/1965 | Davis |
| 3,224,720 A | | 12/1965 | Hain |
| 3,490,727 A | | 1/1970 | Miller |
| 3,547,391 A | * | 12/1970 | Johnson .................... 248/311.3 |
| 3,565,384 A | * | 2/1971 | Lockwood .................... 248/312 |
| 3,603,550 A | * | 9/1971 | Byrd ........................... 248/313 |
| D222,527 S | | 11/1971 | Ziaylek, Jr. |
| 3,667,714 A | | 6/1972 | Ziaylek, Jr. |

(List continued on next page.)

FOREIGN PATENT DOCUMENTS

EP 0903162 2/2000

*Primary Examiner*—Korie Chan
*Assistant Examiner*—Naschica S. Morrison
(74) *Attorney, Agent, or Firm*—Sperry, Zoda & Kane (57) ABSTRACT

A tank holding assembly for releasably securing a tank therewithin which is attachable to a hollow seat back to facilitate rapid tank donning when seated. A housing is included with a tank receiving recess positionable in the hollow seat back area. The housing is preferably made of a flexibly resilient plastic material for protection of the tank but includes a retaining bracket, preferably of metal, secured to the rear portion for strengthening and securement to a seat back. A restraining strap extends through openings defined in the housing and the retaining bracket and around the tank for firm securement thereof. A releasable clasping device can be included for selectively holding the restraining strap extending about the tank. A release lanyard can be included for facilitating speedy disengaging of the clasping device. A magnetic device is designed for holding the clasp in the opened position.

13 Claims, 5 Drawing Sheets

U.S. PATENT DOCUMENTS

| | | | |
|---|---|---|---|
| 3,696,471 A | * 10/1972 | Mermelstein | 24/193 |
| 3,732,843 A | * 5/1973 | Pappas et al. | 116/86 |
| 3,780,972 A | 12/1973 | Brodersen | |
| 3,791,403 A | * 2/1974 | Folkerth | 137/343 |
| 3,823,907 A | 7/1974 | Ziaylek, Jr. | |
| D237,357 S | 10/1975 | Ziaylek, Jr. | |
| 3,971,591 A | 7/1976 | Ziaylek | |
| D244,392 S | 5/1977 | Montambo | |
| D245,929 S | * 9/1977 | Montambo | D29/130 |
| 4,049,164 A | * 9/1977 | Sullivan et al. | 224/633 |
| 4,213,592 A | * 7/1980 | Lingenfelser | 248/313 |
| 4,310,110 A | * 1/1982 | Dexter | 224/246 |
| 4,379,541 A | * 4/1983 | Harkness | 248/544 |
| 4,391,377 A | * 7/1983 | Ziaylek, Jr. | 211/85.18 |
| 4,444,358 A | 4/1984 | Spohn et al. | |
| 4,555,083 A | 11/1985 | Carter | |
| 4,586,687 A | 5/1986 | Ziaylek, Jr. | |
| 4,828,211 A | 5/1989 | McConnell et al. | |
| 4,848,714 A | 7/1989 | Ziaylek, Jr. et al. | |
| D303,738 S | 10/1989 | Ziaylek, Jr. | |
| 4,905,950 A | * 3/1990 | Turner et al. | 248/313 |
| D314,325 S | 2/1991 | Ziaylek, Jr. et al. | |
| 5,025,935 A | 6/1991 | Hadachek | |
| 5,098,054 A | * 3/1992 | Dyer | 248/313 |
| 5,213,392 A | * 5/1993 | Bostrom et al. | 297/188.04 |
| 5,275,462 A | * 1/1994 | Pond et al. | 297/188.04 |
| 5,314,233 A | * 5/1994 | Bostrom et al. | 297/217.1 |
| D347,735 S | 6/1994 | Ziaylek, Jr. et al. | |
| 5,354,029 A | 10/1994 | Ziaylek, Jr. et al. | |
| 5,362,022 A | 11/1994 | McLoughlin et al. | |
| D353,242 S | 12/1994 | McCoy, Sr. et al. | |
| 5,681,080 A | * 10/1997 | Pond et al. | 297/188.05 |
| D394,381 S | 5/1998 | Ziaylek, Jr. et al. | |
| 5,793,280 A | * 8/1998 | Hincher | 340/326 |
| 5,833,195 A | 11/1998 | Haynes | |
| 5,934,749 A | * 8/1999 | Pond et al. | 297/188.04 |
| D424,414 S | 5/2000 | Ziaylek et al. | |
| 6,124,796 A | 9/2000 | Hincher | |
| 6,220,557 B1 | 4/2001 | Ziaylek et al. | |
| 6,367,753 B1 | * 4/2002 | Berg | 248/222.11 |
| 6,601,923 B2 | * 8/2003 | Pond et al. | 297/484 |
| 2003/0038525 A1 | * 2/2003 | Pond et al. | 297/452.29 |
| 2003/0047971 A1 | * 3/2003 | Fohrenkamm et al. | 297/188.04 |

* cited by examiner

RELEASABLE TANK HOLDING ASSEMBLY SECURABLE TO A HOLLOW SEAT BACK TO FACILITATE DETACHABLE SECUREMENT OF A TANK THEREINTO

BACKGROUND OF THE INVENTION

1. Field of the Invention

The present invention deals with the field of devices for facilitating rapid deployment of emergency personnel such as firefighters at the site of emergencies. Such devices can include a releasable tank holding device mounted in the hollow back of a seat in an emergency vehicle such as a fire truck. A firefighter can sit on the seat and attach the tank which is temporarily held in the housing and retaining bracket within the hollow seat back. The firefighter can attach the tank to his back and then pull a lanyard which will disengage a clasp which holds restraining straps in position tethering the tank thereto such that the tank will be released and the firefighter can move to the site of the emergency with a breathing tank deployed properly upon his back. The present invention provides a unique improvement over prior art devices by the unique configuration of the housing with a tank receiving recess defined therein and a retaining bracket extending about the rear portion thereof with a restraining strap and the clasp therefore used in combination therewith.

2. Description of the Prior Art

Many prior art devices have been used for the purposes of detachably holding a tank such as a self-contained breathing apparatus with respect to another surface such as a wall or hollow seat back such as shown in U.S. Pat. No. 2,029,051 issued Jan. 28, 1936 to A. C. Blevins and assigned to Nu-Deal Handle Co. on a "Bottle Holder"; and U.S. Pat. No. 2,614,519 issued Oct. 21, 1952 to A J. Paladino on a "Combined Fire Alarm And Extinguisher Holder"; and U.S. Pat. No. 3,144,232 issued Aug. 11, 1964 to H. O. Smootz on a "Torch Holder"; and U.S. Pat. No. 3,204,775 issued Sep. 7, 1965 to G. L. Smith et al on a "Support For Self-Contained Breathing Apparatus"; and U.S. Pat. No. 3,224,644 issued Dec. 21, 1965 to W. J. Davis on a "Dispenser"; and U.S. Pat. No. 3,224,720 issued Dec. 21, 1965 to C. L. Hain and assigned to The Fire Guard Corporation on a "Combined Handle Lock And Bracket For Fire Extinguishers"; and U.S. Pat. No. 3,490,727 issued Jan. 20, 1970 to H. Q. Miller on a "Holding Apparatus For Loads Adapted To Be Strapped To The Back Of Humans"; and U.S. Pat. No. 3,547,391 issued Dec. 15, 1970 to D. E. Johnson on a "Quick Release Support For Rescue Breathing Apparatus"; and U.S. Pat. No. 3,603,550 issued Sep. 7, 1971 to C. D. Byrd and assigned to Lacy J. Miller Machine Company, Inc. on a "Quick Release Support"; and U.S. Pat. No. 3,667,714 issued Jun. 6, 1972 to T. Ziaylek, Jr. on a "Tank Support"; and U.S. Pat. No. 3,780,972 issued Dec. 25, 1973 to J. C. Brodersen on a "Mounting Apparatus For Gas Containers"; and U.S. Pat. No. 3,823,907 issued Jul. 16, 1974 to T. Ziaylek, Jr. on a "Positive Locking Device"; and U.S. Pat. No. 3,971,591 issued Jul. 27, 1976 to J. Ziaylek and assigned to Ziamatic Corporation on a "Quic-Seat"; and U.S. Pat. No. 4,444,358 issued to D. M. Spohn et al on Apr. 24, 1984 on a "Fluid Reservoir And Connector"; and U.S. Pat. No. 4,555,083 issued Nov. 26, 1985 to F. D. Carter on a "Scuba Tank Positioner"; and U.S. Pat. No. 4,586,687 issued May 6, 1986 to T. Ziaylek, Jr. on an "Air Tank Support Of The Quick Release Type"; and U.S. Pat. No. 4,828,211 issued May 9, 1989 to D. McConnell et al and assigned to ITC, Incorporated on a "Foldable Support For Beverage Container"; and U.S. Pat. No. 4,848,714 issued Jul. 18, 1989 to T. Ziaylek, Jr. et al on a "Mounting Plate With Rollers"; and U.S. Pat. No. 5,025,935 issued Jun. 25, 1991 to J. L. Hadachek on a "Portable Upright Scuba Cylinder Retention Rack"; and U.S. Pat. No. 5,354,029 issued Oct. 11, 1994 to T. Ziaylek, Jr. on a "Quick Release Tank Support Bracket With Positive Locking Engagement Means"; and U.S. Pat. No. 5,362,022 issued Nov. 8, 1994 to J. E. McLoughlin et al on an "Air-Tank Bracket With Strap-Lifting Arms"; and U.S. Pat. No. 5,833,195 issued to D. H. Haynes on Nov. 10, 1998 and assigned to The United States of America as represented by the Secretary of the Army on a "Gas Retaining Device"; and U.S. Pat. No. 6,124,796 issued Sep. 26, 2000 to W. Hincher on a "Fire Equipment Bracket Having Integral Locating Beacon"; and U.S. Pat. No. 6,220,557 issued Apr. 24, 2001 to M. P. Ziaylek et al and assigned to Michael P. Ziaylek, Theodore Ziaylek, Jr. and Theodore P. Ziaylek on a "Mounting Bracket Means For Detachably Supporting A Generally Cylindrically-Shaped Member Upon A Wall Surface"; and U.S. Des. Pat. No. 222,527 issued to T. Ziaylek, Jr. on Nov. 2, 1971 on a "Bracket For Use With Lifesaving Equipment"; and U.S. Des. Pat. No. 237,357 issued Oct. 28, 1975 to T. Ziaylek, Jr. et al and assigned to Ziamatic Corp. on a "Tank Support Bracket For Lifesaving Equipment"; and U.S. Des. Pat. No. 244,392 issued May 17, 1977 to R. J. Montambo and assigned to The Ansul Company on a "Combined Fire Extinguisher And Bracket"; and U.S. Des. Pat. No. 303,738 issued Oct. 3, 1989 to T. Ziaylek, Jr. on a "Rotatable Cylinder Holder"; and U.S. Des. Pat. No. 314,325 issued Feb. 5, 1991 to T. Ziaylek, Jr. et al on a "Clamping Set Of Bracket Arms For Supporting Tubular Objects"; and U.S. Pat. No. 347,735 issued Jun. 14, 1994 to T. Ziaylek, Jr. et al on a "Quick Release Support Tank Bracket"; and U.S. Des. Pat. No. 353,242 issued Dec. 6, 1994 to G. W. McCoy, Sr. et al on a "Paint Can Holder"; and U.S. Des. Pat. No. 394,381 issued May 19, 1998 to T. Ziaylek, Jr. et al on a "Tank Bracket"; and U.S. Des. Pat. No. 424,414 issued May 9, 2000 to M. P. Ziaylek, Jr. et al and assigned to Michael P. Ziaylek, Theodore Ziaylek, Jr. and Theodore P. Ziaylek on an "Adjustable Mounting Bracket For A Cylindrical Member" and European Patent No. EP0903161A2.

SUMMARY OF THE INVENTION

The present invention provides a releasable tank holding assembly which can be fixedly secured to a hollow seat back for the purpose of detachable securement of a tank thereinto as desired. Such a device is often utilized on fire trucks on the seats on which firefighters or other emergency personnel will be seated such that they can quickly don self-contained breathing apparatus while in a seat traveling to the site of a fire or other emergency.

The assembly preferably includes a housing which is fixedly secured to the hollow seat back and defines a tank receiving recess therein. Preferably this receiving recess is concave in vertical cross section to facilitate the holding of a tank therein in a releasable manner. The housing is preferably made of a flexibly resilient thermoplastic material to facilitate retaining of the tank in a protective manner within the tank receiving recess. The housing preferably extends at least partially around the tank when it is positioned within the tank receiving recess in order to further protect the tank while attached therein. The housing preferably includes a plurality of housing restraint slots.

A retaining bracket may also be included which is fixedly secured to the housing for strengthening thereof. This retaining bracket will also facilitate fixed securement of the housing to a hollow seat back. The retaining bracket preferably is made of a metallic material for strengthening and stiffening of the housing. This retaining bracket preferably defines a plurality of bracket restraint slots therein. Also it is preferable that the retaining bracket include a lower support shelf extending below the tank receiving recess in order to support a tank from beneath when it is positioned within the recess.

A restraining strap mechanism is also included with the present invention which is preferably attached to the housing and to the retaining bracket. This restraining strap is preferably adjustable in length and is detachably securable around the tank when it is positioned in the tank receiving recess for retaining it in position therein for storage. The restraining strap preferably is also detachable from the tank in order to selectively facilitate release and removal thereof from the tank receiving recess. The restraining strap is adapted to extend through the housing restraint slots to facilitate detachable securement of the tank in the tank receiving recess and similarly is adapted to extend through the bracket restraint slots for the same purpose.

A clasping device may be included secured to the restraining strap and positionable in a closed position to facilitate retaining of the tank within a tank receiving recess by the restraining strap extending therearound. This clasping device is preferably movable to an opened position in order to facilitate release of the tank by the restraining strap. The clasp preferably is made of a metallic material and includes a first side member and a second side member which each are attached to the strap portion itself and are detachably securable from one another to facilitate movement of the clasping means between the opened and closed positions respectively. A temporary clasp holding device may also be included for the purpose of retaining the clasping device in the opened position to facilitate movement of the tank into the tank receiving recess with the restraining strap extending therearound. This temporary clasp holding means preferably includes a magnetic holding device to facilitate retaining of the clasp in the opened position selectively during movement of the tank into the tank receiving recess.

A release lanyard may be included attached to the clasp and extending outwardly away therefrom to facilitate movement thereof from the closed position to the opened position suddenly for the purpose of releasing the tank from the tank receiving recess in a quick manner. Also a plurality of bumpers may be spatially positioned from one another and be secured on the interior of the housing within the tank receiving recess in order to spatially dispose the tank positioned within the tank receiving recess from the housing for facilitating protection thereof.

Additionally the housing may define a plurality of lower housing restraint slots therein and a plurality of upper housing restraint slots therebelow. In this manner the retaining bracket can also be configured to define a plurality of lower bracket restraint slots therein in a plurality of upper bracket restraint slots positioned thereabove. The restraining strap is adapted to extend through the lower housing restraint slots and through the lower bracket restraint slots. The restraint strap is also adapted to extend through the upper housing restraint slots and the upper bracket restraint slots to further facilitate detachable angular securement of the tank within the tank receiving recess of the housing by the restraining strap means itself. Furthermore the housing may define a plurality of inwardly projecting sections extending into the tank receiving recess to facilitate positioning of a tank protectively therein spatially disposed from the housing.

It is an object of the present invention to provide a releasable tank holding assembly securable to a hollow seat back to facilitate detachable securement of a tank thereinto which holds a tank in such a manner as to prevent damage thereof especially when utilized with non-metallic tanks normally made of composite material.

It is an object of the present invention to provide a releasable tank holding assembly securable to a hollow seat back to facilitate detachable securement of a tank thereinto which includes a retaining bracket for stiffening and facilitating mounting of the tank housing.

It is an object of the present invention to provide a releasable tank holding assembly securable to a hollow seat back to facilitate detachable securement of a tank thereinto which includes a retaining bracket of metal material for facilitating mounting and strengthening of the housing which is formed preferably of a thermoplastic material.

It is an object of the present invention to provide a releasable tank holding assembly securable to a hollow seat back to facilitate detachable securement of a tank thereinto which includes a two-piece clasping means engageable and disengageable with respect to itself to hold a restraining strap in engagement or out of engagement with respect to a tank positioned in the tank receiving recess.

It is an object of the present invention to provide a releasable tank holding assembly securable to a hollow seat back to facilitate detachable securement of a tank thereinto which can be usable for rapid deployment of self-contained breathing apparatus for emergency personnel such as firefighters.

It is an object of the present invention to provide a releasable tank holding assembly securable to a hollow seat back to facilitate detachable securement of a tank thereinto which has minimal maintenance requirements.

It is an object of the present invention to provide a releasable tank holding assembly securable to a hollow seat back to facilitate detachable securement of a tank thereinto which is usable with seating configuration within emergency vehicles such as fire trucks and ambulances.

It is an object of the present invention to provide a releasable tank holding assembly securable to a hollow seat back to facilitate detachable securement of a tank thereinto which defines a concave housing for surrounding and for engagement and protection of a self-contained breathing tank.

It is an object of the present invention to provide a releasable tank holding assembly securable to a hollow seat back to facilitate detachable securement of a tank thereinto which includes lower support for beneath the tank by the inclusion of a lower support shelf in the retaining bracket.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a releasable holding assembly usable for the retaining of a tank 10 with respect to a seat 12. Preferably the seat 12 will be positioned within an emergency vehicle or other such fire truck and will include a hollow seat back 14 which defines a recess therein for retaining the releasable tank holding assembly to allow a tank to be detachably secured therewithin.

Figure 1:
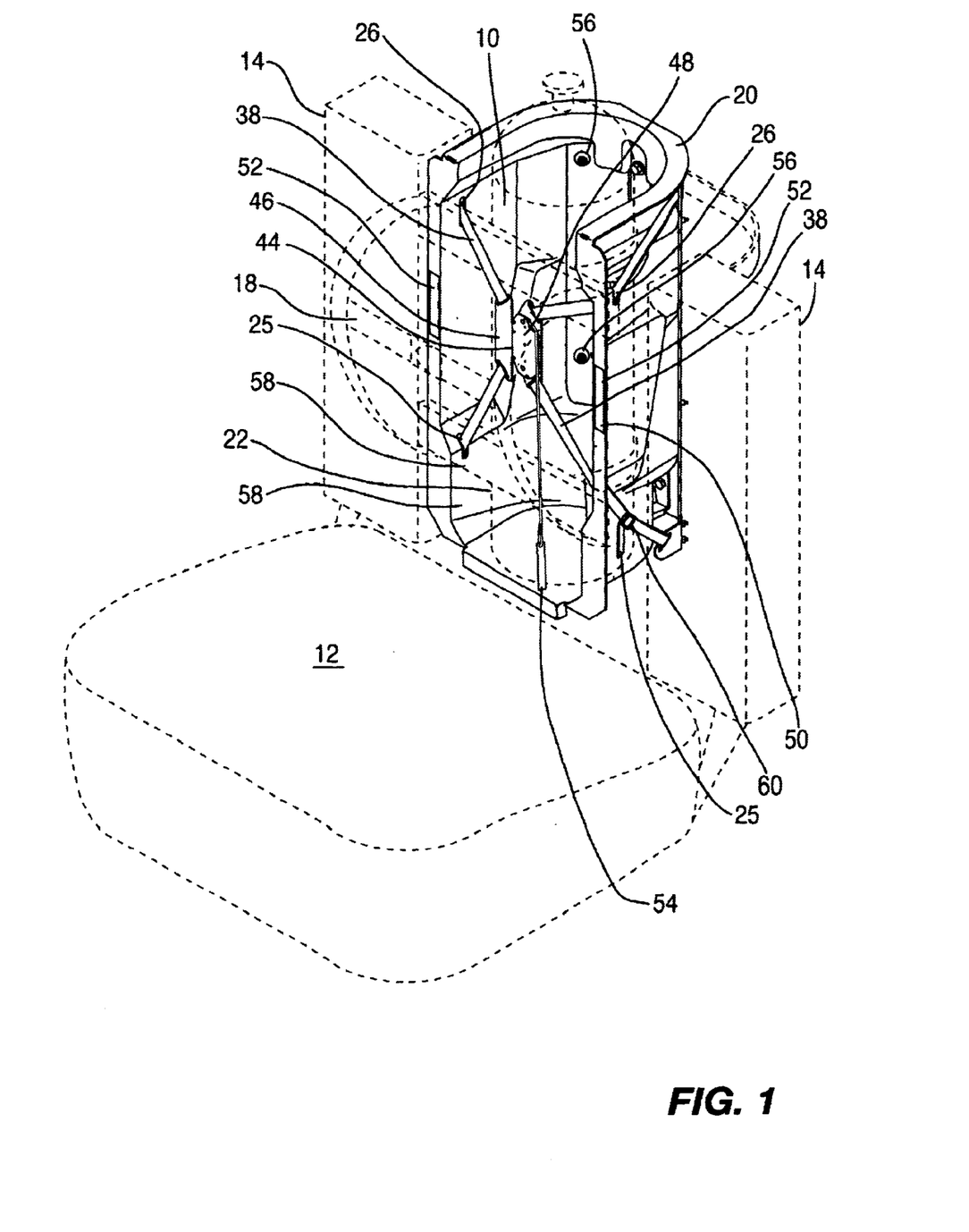
FIG. 1 is a perspective illustration of an embodiment of the releasable tank holding assembly of the present invention shown secured to a hollow seat back with a tank retained therein.
Figure 2:
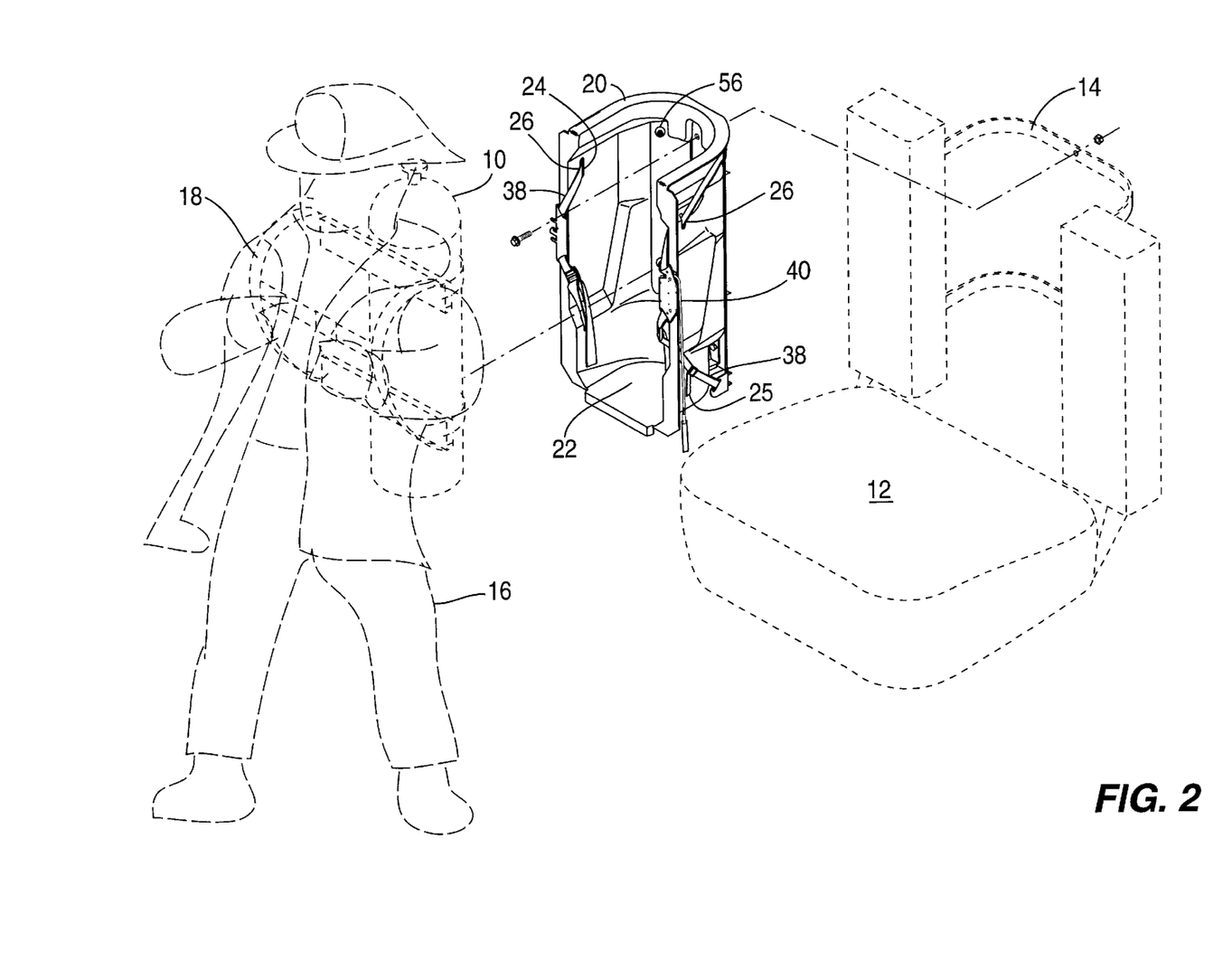
FIG. 2 is an exploded view of the embodiment shown in FIG. 1 showing a firefighter immediately after removing of the tank therefrom mounted upon his back.

The basic holding assembly allows a tank to be easily attached and secured therein or detached and removed therefrom such as by emergency personnel. Such emergency personnel, for example like a firefighter 16, can sit in the seat 12 which may be in an emergency vehicle such as fire truck and attach a tank vest 18 to the user's body which vest is attached to the tank 10 positioned in the assembly in the hollow seat back 14. The user can then release the releasable tank holding assembly to thereby detach the tank 10 from the seat 12 in such a manner that when the firefighter 16 stands up and moves to address the emergency situation the tank 10 will be carried on this back and will be held there by the tank vest 18 which he puts on while seated in the seat 12. Normally such tanks 12 will include the tank as well as self-contained breathing apparatus usable therewith.

The construction of the releasable tank holding assembly of the present invention includes a housing 20 which defines therein a tank receiving recess 22 which is preferably of a concave shape to facilitate retaining and holding removably of a tank 10 therewithin. Tank receiving recess 22 is preferably concave in vertical cross section and is defined by the form of the housing 20.

Figure 3:
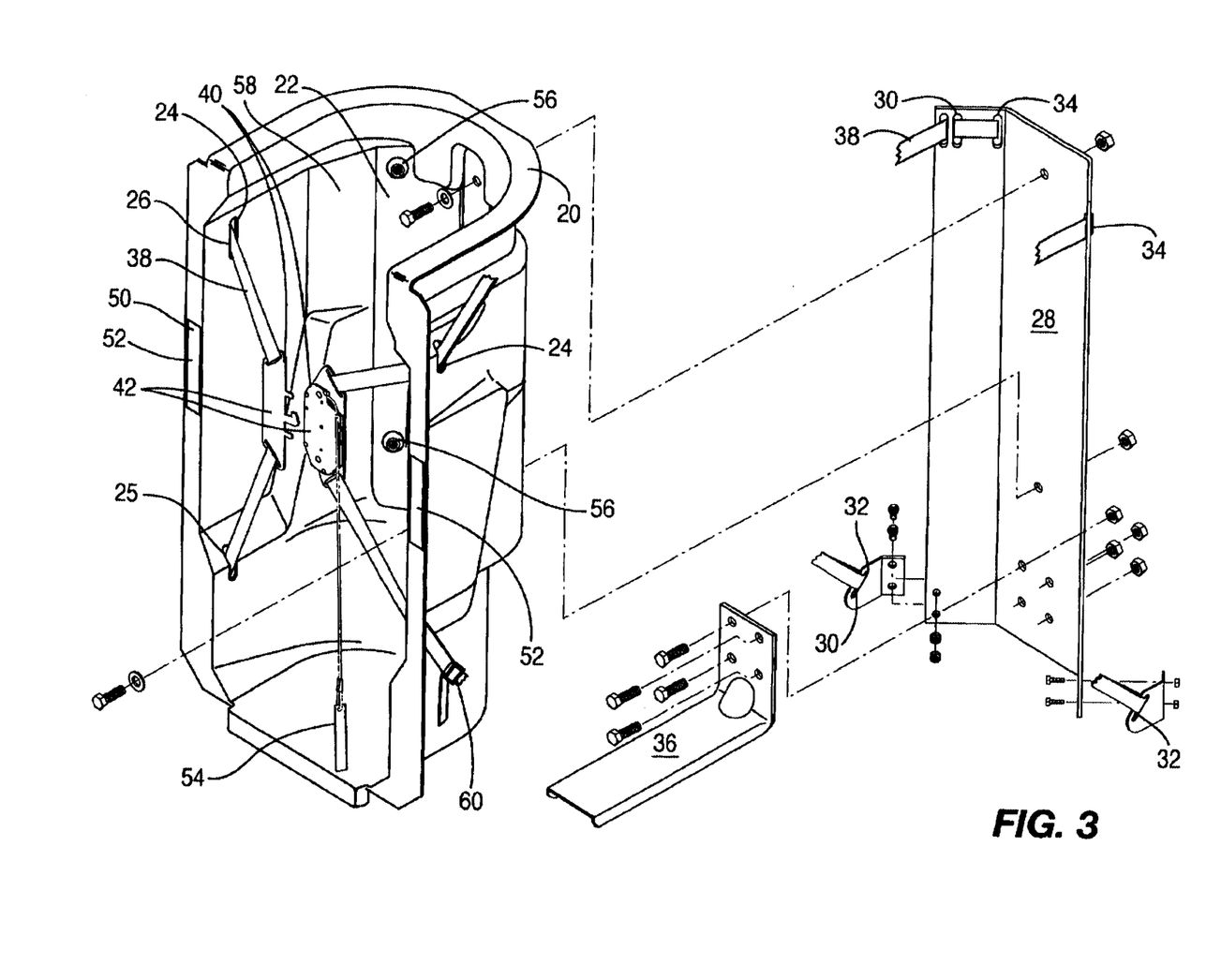
FIG. 3 is an exploded view of an embodiment of the releasable tank holding assembly of the present invention showing the housing and retaining bracket exploded.
Figure 4:
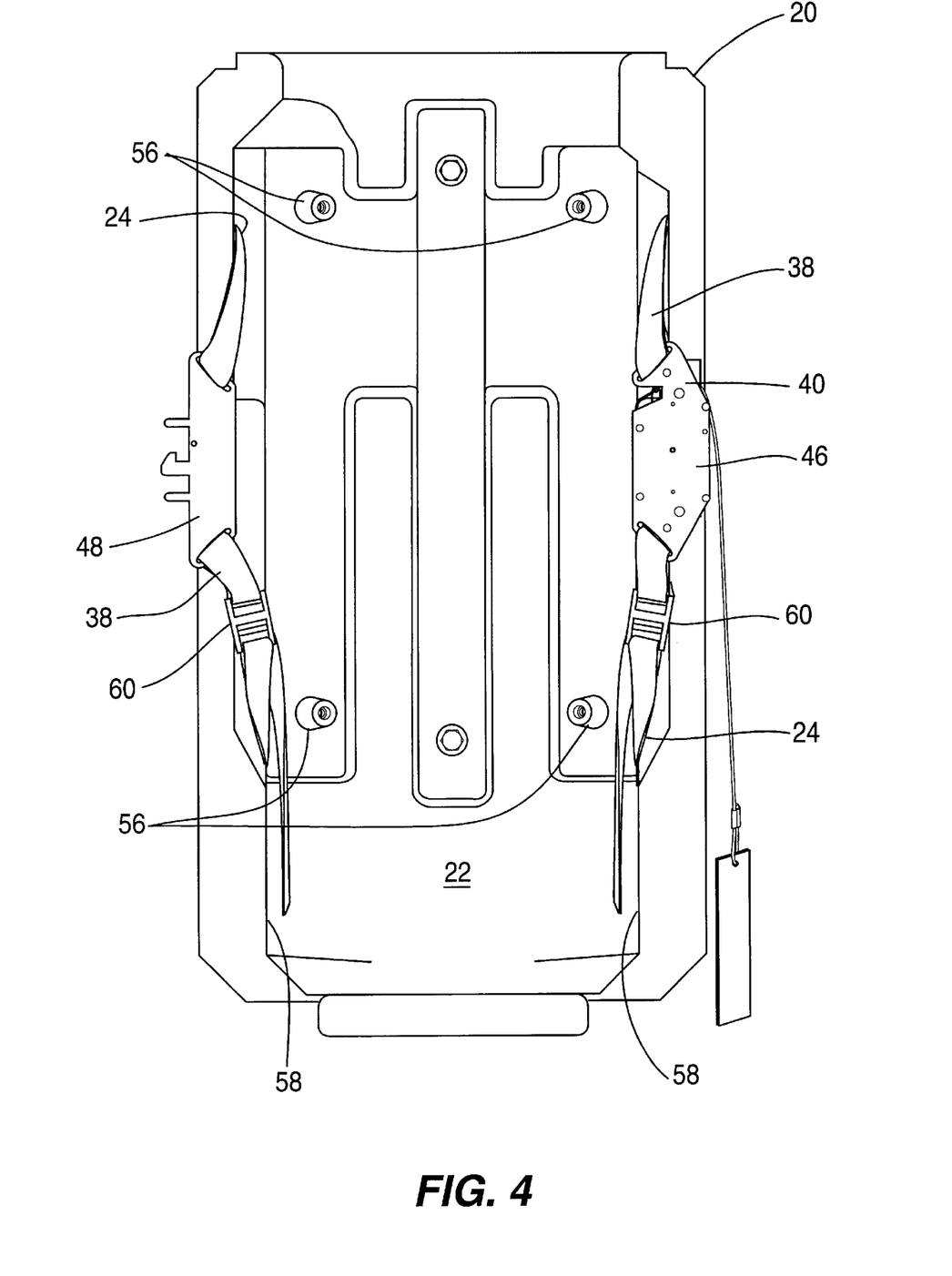
FIG. 4 is a front plan view of an embodiment of the releasable tank holding assembly of the present invention.
Figure 5:
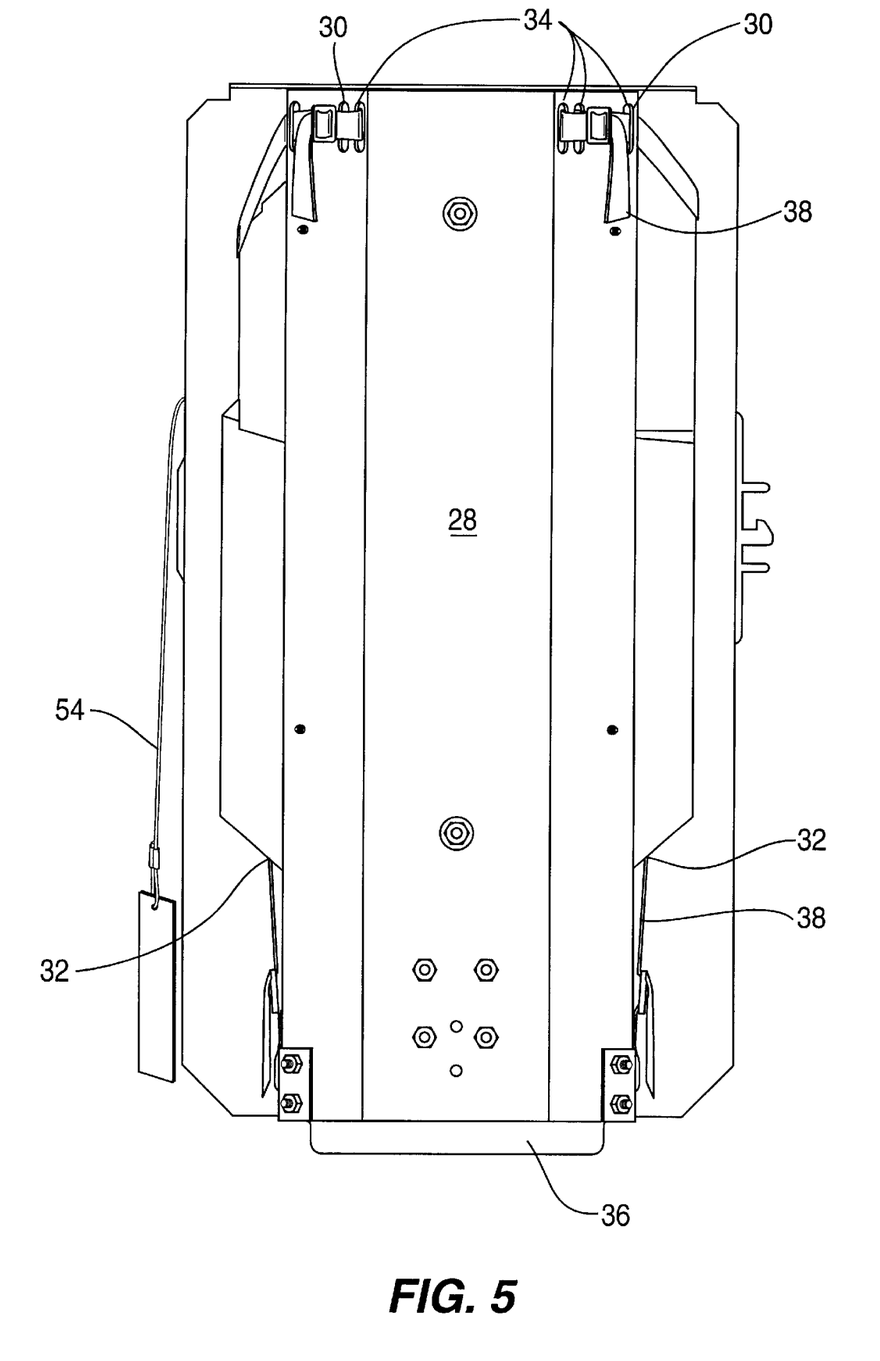
FIG. 5 is a rear plan view of an embodiment of the releasable tank holding assembly of the present invention.

A retaining bracket 28 is preferably secured to the housing 20 immediately therebehind between the housing 20 and the hollow seat back 14. In this manner the retaining bracket 28 will provide significant strengthening of the housing 20. In most configurations housing 20 is formed of a thermoplastic material which may be somewhat flexibly resilient in order to prevent damaging of the tank 10. With this type of a construction the retaining bracket 28 will normally be chosen of a metal or other hard material for strengthening of the configuration of housing 20 while at the same time providing a secure means of attached attachment thereof with respect to the seat back 14. Bracket 28 can include a lower support shelf 36 preferably made of metal which support the tank 10 and the housing 20 from below for support thereunder. Lower support shelf 36 preferably extends horizontally outwardly from bracket 28 immediately beneath the underside of housing 20.

The releasable tank holding assembly also preferably includes a restraining strap means or configuration 38 which extends through the housing 20 and preferably also through the retaining bracket 28 and includes two ends with a clasping means 40 secured thereto. The clasping means 40 will preferably include a first side member 46 secured to one portion of the restraining strap 38 and will include a second side member 48 secured to another portion of the restraining strap 38. The clasping means can then be moved to a closed position 44 as shown best in FIG. 1 for retaining of a tank 10 within the tank receiving recess 22 of housing 20. The clasping means 40 can also be moved to an opened position 42 such that the restraining strap 38 will release tank 10 from securement in the tank receiving recess 22 of housing 20 and in this manner allow removal thereof. Actuation of movement of the clasping means 40 to the opened position 42 from the closed position 44 can be facilitated by the inclusion of a release lanyard 54 which will extend outwardly away from clasping means 40 and which can be pulled in order to move clasping means 40 from the closed position 44 to the opened position 42 and in this manner release the tank 10 from the tank holding assembly of the present invention. This lanyard 54 preferably can be of any chosen length which allows the firefighter 16 or other user to conveniently reach the release lanyard 54 for pulling thereof when the tank 10 is still retained within the housing 20 and when the user 16 is ready to leave the seat 12. Thus the release lanyard or release means 54 provides a remote means of disengaging clasping means 40 or movement thereof to the opened position 42 allowing a firefighter 16 to leave with the tank 12 attached to his body by way of a conventional tank vest 18.

To facilitate placement of a tank 10 into the tank receiving recess 22 of housing 20 a temporary clasp holding means 50 is preferably included positioned on each side of the housing 20 on opposite sides of the tank receiving recess 22. Preferably these temporary clasp holding means 50 include magnetic holding means 52 when used with a metal clasp 40. Clasp 40 when disengaged will have the first and second sides 46 and 48 separated from one another. Preferably the first side member 46 will be attached with respect to one of the magnetic holding members 52 and the second side member 48 will be secured to the other magnetic temporary clasping means 52. In this manner the person who is placing the tank 10 in the housing 20 in the hollow seat back 14 of seat 12 will find this activity significantly easier because the two halves of the clasping means 40 are maintained to the sides of the front opening through which the tank 10 must be loaded. Release of the first and second side members 46 and 48 of clasp 40 is easily achieved especially when utilizing a magnetic holding means 52 in order to move the clasp 40 to the closed position 44 for storage of the tank 10 in position within the hollow seat back 14.

Securement of the tank 10 with respect to the housing 20 by the restraining strap means 38 is greatly facilitated by the defining of a plurality of openings or slots in the housing 20 referred to as housing restraint slots 24. Preferably such housing restraint slots 24 will include lower such housing restraint slots 25 and upper housing restraint slots 26. It is preferable that the restraining strap means 38 extend through all of the restraint slots 24, 25 and 26 and around the tank 10 in such a manner as to securely but detachably hold the tank in position within the tank receiving recess 22 of housing 20.

To further fixedly secure the positioning of the tank in the stored position within the recess 22 of housing 20 a plurality of slots are defined also in the bracket positioned immediately behind and adjacent to the housing. In this manner retaining bracket 28 will include bracket restraint slots 30 including both upper bracket restraint slots 34 and lower bracket restraint slots 32. Preferably the restraining strap means 38 will extend through all of these slots 30, 32 and 34 in such a manner as to more firmly and fixedly secure the tank 10 in position within the tank receiving recess 22 of housing 20 while at the same time maintaining the detachable capability thereof. It is an important advantage of one of the embodiments of the present invention that the housing restraint slots and the bracket restraint slots include both upper and lower slots to facilitate angular forces being exerted upon the tank 10 for maintaining thereof in the stored position within the tank receiving recess 22 of housing 20. Also it is preferable that the restraining strap means 38 extend through not only the housing restraint slots 24 but also the bracket restraint slots 30 since the bracket will normally be chosen of a metal material and provide significant additional strength to the releasable tank holding assembly of the present invention.

It is also preferred in the present invention that the tank 10 be protected from any damage thereto. This is a requirement with more modern equipment in view of the fact that most tanks are formed of lightweight non-metallic composite material. This material allows the tanks to be significantly lighter and more easily carried however they are more susceptible in some circumstances to damaging from impact or cutting or denting. For this reason the present invention includes a plurality of bumper means 56 preferably of a rubber or other flexible material mounted to the housing 20 within the tank receiving recess 22 which are adapted to abut the tank 10 when it is placed within the recess 22 and minimize contact thereof with respect to the housing 20 or the hardware which affixes the housing 20 with respect to the retaining bracket 28 or the hollow seat back 14. Similarly the housing 20 which preferably is of a flexible softer thermoplastic material can include inwardly projecting sections 58 which also can contact the outer surface of the tank 10 in such a manner as to firmly retain the tank within the tank receiving recess 22 while at the same time minimizing damage to the external surface thereof. This is an important consideration in certain embodiments since the tank is then isolated from contact with any metallic parts such as the retaining bracket 28 because it is cradled within the concave tank receiving recess 22 of housing 20 which is formed of preferably thermoplastic material. Also the restraint strap 38 preferably is adjustable as to length to accommodate various sizes of tanks and for this purpose may include adjustment buckles 60 at various locations along the entire length of the restraining strap means 38.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A releasable tank holding assembly secured to a hollow seat back to facilitate detachable securement of a tank thereinto comprising:
   A. a housing fixedly secured to a the hollow seat back and defining a tank receiving recess therewithin to facilitate releasable holding of a tank therein, said housing being made of a flexibly resilient thermoplastic material to facilitate retaining of the tank protectively within said tank receiving recess defined therein, said housing defining a plurality of lower housing restraint slots extending therethrough, said housing also defining a plurality of upper housing restraint slots extending therethrough at a location above said lower housing restraint slots;
   B. a retaining bracket fixedly secured to said housing for strengthening thereof and to facilitate fixed securement of said housing to a the hollow seat back, said retaining bracket being metal for facilitating stiffening of said housing made of a flexibly resilient thermoplastic material, said retaining bracket defining a plurality of lower bracket restraint slots therein oriented extending in a plane parallel to and displaced from the plane of said lower housing restraint slots to facilitate relative registration therebetween, said retaining bracket further defining a plurality of upper bracket restraint slots positioned above said lower bracket restraint slots;
   C. a restraining strap attached to said housing and attached to said retaining bracket said restraining strap being detachably securable to a tank positioned within said tank receiving recess for holding thereof in position within said tank receiving recess of said housing for storage thereof, said restraining strap being detachable from the tank to selectively facilitate release and removal thereof from said tank receiving recess, said restraining strap adapted to extend through said lower housing restraint slots and through said lower bracket restraint slots to facilitate retaining of the tank adjacent to said retaining bracket within said tank receiving recess, said restraining strap mean also adapted to extend through said upper housing restraint slots and said upper bracket restraint slots to further facilitate detachable angular securement of the tank adjacent said retaining bracket within said tank receiving recess of said housing by said restraining strap, said restraining strap including an adjustment means for varying the length thereof to facilitate retaining of the tank within said tank receiving recess, said adjustment means being positioned on said restraining strap between said lower bracket restraint slots and said lower housing restraint slots to facilitate accessing adjustment of the length of said restraining strap as desired; and
   D. a clasping means secured to said restraining strap and positionable in a closed position to facilitate restraining of the tank within said tank receiving recess by said restraining strap extending therearound, said clasping means being movable to an opened position to facilitate release of the tank by said restraining strap.

2. A releasable tank holding assembly secured to a hollow seat back to facilitate detachable securement of a tank thereinto as defined in claim 1 wherein said housing extends at least partially around a tank retained with said tank receiving recess defined therein in order to facilitate protective attachment of the tank therein.

3. A releasable tank holding assembly secured to a hollow seat back to facilitate detachable securement of a tank thereinto as defined in claim 2 wherein said tank receiving recess of said housing is concave to facilitate receiving and retaining of the tank therewithin.

4. A releasable tank holding assembly secured to a hollow seat back to facilitate detachable securement of a tank thereinto as defined in claim 1 further comprising a temporary clasp holding means for retaining of said clasping means in the opened position to facilitate movement of a tank into said tank receiving recess with said restraining strap extending therearound.

5. A releasable tank holding assembly secured to a hollow seat back to facilitate detachable securement of a tank thereinto as defined in claim 4, wherein said clasping means is made of metal and said temporary clasp holding means includes magnetic holding means to facilitate retaining of said clasping means in the opened position during movement of the tank into said tank receiving recess.

6. A releasable tank holding assembly secured to a hollow seat back to facilitate detachable securement of a tank thereinto as defined in claim 1 wherein said restraining strap include adjustment means for varying the length thereof to facilitate retaining of the tank within said tank receiving recess.

7. A releasable tank holding assembly secured to a hollow seat back to facilitate detachable securement of a tank thereinto as defined in claim 1 further comprising a release means attached to said clasping means to facilitate movement thereof from the closed position to the opened position to promptly release the tank from said tank receiving recess.

8. A releasable tank holding assembly secured to a hollow seat back to facilitate detachable securement of a tank thereinto as defined in claim 7 wherein said release means includes a release lanyard means attached to said release means and extending away therefrom to further facilitate removal actuation thereof to facilitate movement thereof from the closed position to the opened position to promptly release the tank from said tank receiving recess.

9. A releasable tank holding assembly secured to a hollow seat back to facilitate detachable securement of a tank thereinto as defined in claim 1 further comprising a plurality of bumper secured to said housing within said tank receiving recess to spatially disposed a tank positioned within said tank receiving recess from said housing for protection thereof.

10. A releasable tank holding assembly secured to a hollow seat back to facilitate detachable securement of a tank thereinto as defined in claim 9 wherein said bumper are spatially disposed from one another and are made of flexibly resilient material for protection of a tank located in said tank receiving recess.

11. A releasable tank holding assembly secured to a hollow seat back to facilitate detachable securement of a tank thereinto as defined in claim 1 further comprising a plurality of inwardly projecting sections of said housing extending into said tank receiving recess to facilitate positioning of a tank protectively therein spatially disposed from said housing.

12. A releasable tank holding assembly secured to a hollow seat back to facilitate detachable securement of a tank thereinto as defined in claim 1 wherein said retaining bracket includes a lower support shelf extending below said tank receiving recess to facilitate support from beneath of a tank positioned therewithin.

13. A releasable tank holding assembly secured to a hollow seat back to facilitate detachable securement of a tank thereinto as defined in claim 1 wherein said clasping means includes a first side member and a second side member attached to said restraining strap and detachably securable with respect to one another to facilitate movement of said clasping means between the opened and closed positions.

* * * * *